United States Patent [19]

Riechmann

[11] Patent Number: 4,754,571
[45] Date of Patent: Jul. 5, 1988

[54] TERRARIUM/AQUARIUM COMBINATION

[76] Inventor: Wolfgang Riechmann, 320 Niska Road, Apt. 907, Downsview, Ontario, Canada

[21] Appl. No.: 906,213

[22] Filed: Sep. 12, 1986

[30] Foreign Application Priority Data

Sep. 12, 1985 [CA] Canada ................................. 490610

[51] Int. Cl.⁴ ...................... A01G 31/02; A01K 63/00
[52] U.S. Cl. .......................................... 47/59; 119/5; 47/69
[58] Field of Search ................ 119/5; 47/69, 59, 39, 47/19, 1.4, 62, 40, 79, 63, 65, 17, 80-82, 2; 405/39-41

[56] References Cited

U.S. PATENT DOCUMENTS

| | | | |
|---|---|---|---|
| 919,157 | 4/1909 | Glaser | 119/5 X |
| 1,263,391 | 4/1918 | Eickemeyer | 119/5 |
| 2,306,027 | 12/1942 | Swaney | 119/5 X |
| 2,751,880 | 6/1956 | Markowski | 119/5 |
| 3,269,578 | 8/1966 | Lewis | 47/69 X |
| 3,283,743 | 11/1966 | Dibelius | 119/5 |
| 3,461,605 | 8/1969 | Stanhope | 47/17 |
| 3,667,158 | 6/1972 | Privett | 47/17 |
| 4,004,551 | 1/1977 | Kato | 119/5 |
| 4,026,243 | 5/1977 | Jessop | 47/69 X |
| 4,056,899 | 11/1977 | Close | 47/79 |
| 4,077,158 | 3/1978 | England | 47/59 |
| 4,098,230 | 7/1978 | Jackson | 119/5 |
| 4,117,805 | 10/1978 | Ward | 47/69 X |
| 4,179,589 | 11/1979 | Daharsh | 47/79 X |
| 4,194,320 | 3/1980 | Svirklys | 47/59 |
| 4,204,499 | 5/1980 | Leyva et al. | 119/5 |
| 4,285,164 | 8/1981 | Moore | 47/69 |
| 4,351,270 | 9/1982 | Sabin | 47/69 X |

FOREIGN PATENT DOCUMENTS

| | | | |
|---|---|---|---|
| 200170 | 7/1908 | Fed. Rep. of Germany | 119/5 |
| 2523086 | 12/1976 | Fed. Rep. of Germany | 47/62 |
| 8100385 | 8/1982 | Netherlands | 47/69 |

*Primary Examiner*—Robert A. Hafer
*Assistant Examiner*—Danton D. DeMille
*Attorney, Agent, or Firm*—Gipple & Hale

[57] ABSTRACT

Apparatus for humidifying indoor air is provided, and includes an open-topped container, having means for circulating air therethrough. Substrate material is provided in the container, the substrate material being suitable for the growth of plants. Means for circulating water through said substrate material is provided, thereby to maintain a substantially constant water content therein. Air circulated past the vicinity of said substrate will tend to retain moisture.

21 Claims, 3 Drawing Sheets

TERRARIUM/AQUARIUM COMBINATION

The present invention relates to the field of horticulture, and provides an improved terrarium/aquarium combination.

Terrariums are well known, and basically provide an enclosed environment in which plants and animals can be raised indoors. A terrarium basically consists of an enclosure, usually glass, and a quantity of soil, in the enclosure, in which plants are grown and small animals, such as turtles, are raised.

It has heretofore been very difficult, if not impossible, to couple a terrarium with an aquarium. The reason for this is that the soil and organic debris from the terrarium tends to flow into the aquarium when they are placed side by side, unless the aquarium is isolated ecologically and spatially from the terrarium. That is, if an aquarium is brought into proximity with a terrarium, with the terrarium acting more or less as the shoreline of the aquarium, normal water flow occasioned by watering the terrarium will tend to wash soil, micro-organisms and debris into the aquarium. This will result in a choking off of the $O_2$ supply of the aquarium from the aquatic life therein, even if an oxygenator and filter is provided in the aquarium, because of the tendencies of soil micro-organisms to consume disproportionate amounts of $O_2$ (due largely to their large aerobic surface to biomass ratios). Furthermore, silt and debris from the terrarium, if allowed to accumulate in the water of the aquarium can clog the gills of fish and other aquatic life living there.

The object of the present invention is to overcome the above-noted obstacles and provide a working terrarium/aquarium combination, which provides more than one observable ecological niche. Another object of the present invention is to provide a terrarium/aquarium system which interacts positively with the human urban environment.

In one broad aspect, the present invention relates to an apparatus for humidifying indoor air including: an open-topped container, having means for circulating air therethrough; substrate material in said container, suitable for the growth of plants; means for circulating water through said substrate material, thereby to maintain a substantially constant water content therein, whereby air circulated past the vicinity of said substrate will tend to retain moisture.

In another broad aspect the present invention relates to, in combination, an aquarium and a terrarium separated therefrom by a partition of predetermined height, and an integrated water circulation system, said water circulation system including a pump, a filter with the pump, at least one conduit extending from said pump and filter to said aquarium for carrying a flow of clean filtered water to said aquarium, and at least one conduit extending from said terrarium to said pump and filter for carrying a flow of water to said pump and filter for cleaning; said terrarium being supplied with water from said aquarium by means of an overflow of water over said partition.

In drawings which illustrate, by way of example, the present invention:

As will be noted from the description of the drawings, and from the drawings themselves, the present invention is applicable to both fresh water and marine biological systems. Since the freshwater application of the invention is somewhat simpler, it will be dealt with first, in the following description.

Figure 1:
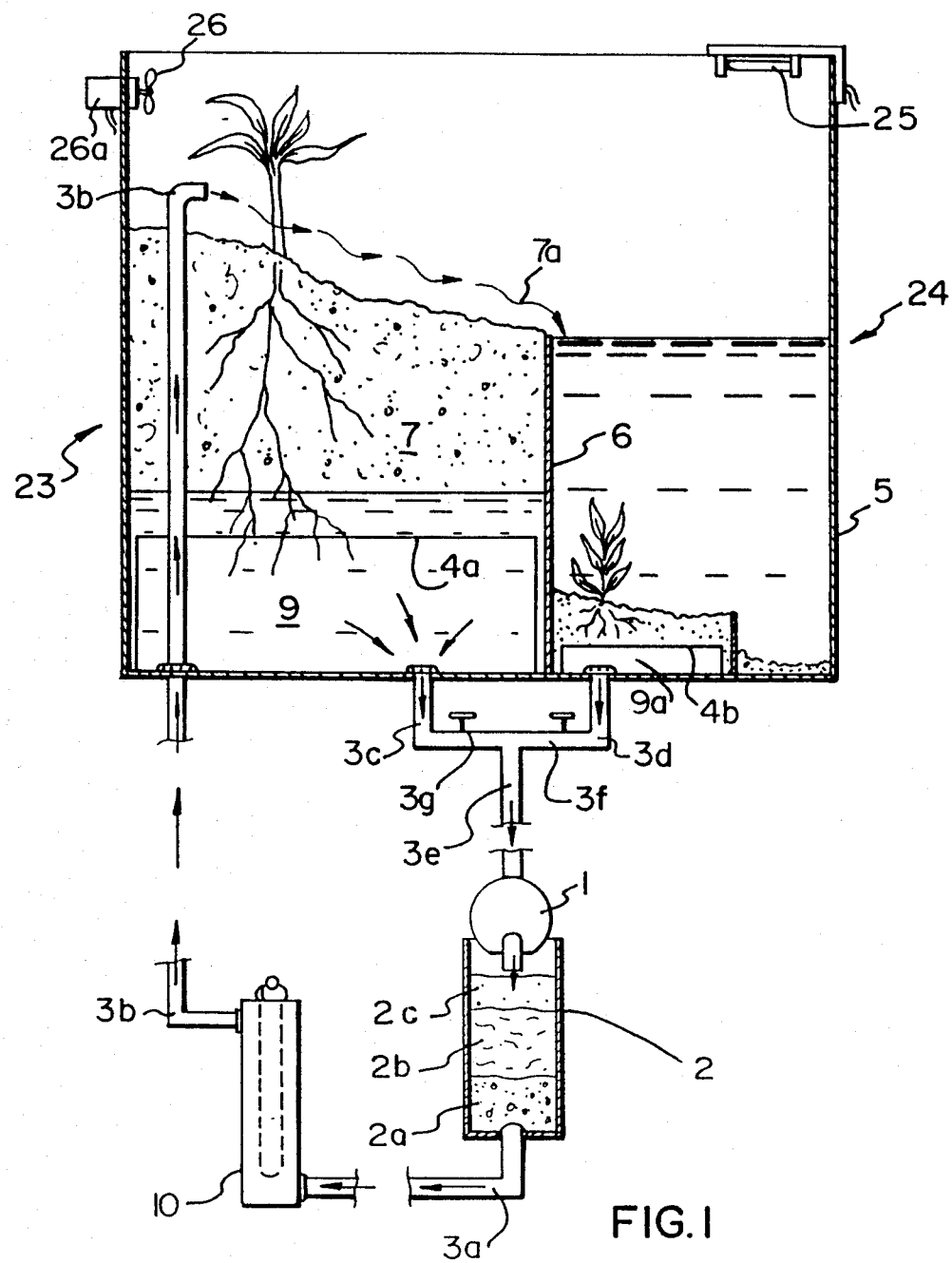
FIG. 1 is a schematic of a freshwater terrarium/aquarium embodiment of the present invention.

Referring to FIG. 1, the major components and reaction sites in the system of the present invention are illustrated schematically. Water is pumped via a pump 1, through a filter 2 including a sponge element 2c, floss 2b and an ion filter medium such as "CHEMI PURE" and through a suitable conduit such as plastic tubing 3a to a heater 10, and then by another conduit 3b to the top of the terrarium. In practice, it is both aesthetically pleasing and beneficial to the $O_2$ content of the water to pump the water to the top of the terrarium section 23 (which will typically be higher than the aquarium), and allow it to trickle down into the aquarium along an artificial watercourse 7a. As the water trickles down, and empties into the aquarium 24, it will be aerated, and so long as the watercourse 7a is kept free of debris, such flow through the terrarium section 23 will not contaminate the aquarium 24.

A partition member 6 separates the aquarium 24 and terrarium 23, and together with the walls of the tank 5 acts as a boundary for each. The partition 6 is, moreover, the lowest wall of the aquarium 24, so that as the water reaches the top of the aquarium 24 it will flow over the top of the partition 6 and into the terrarium 23. It will be appreciated, therefore, that the top edge of the partition 6 should be straight and level, so that water will flow into the terrarium 24 along the entire top edge of the partition 6. A filter plate 4a is provided beneath the terrarium substrate 7, and the space beneath it defines a reservoir 9. Another filter plate 4b is provided in the aquarium section 24, defining an undergravel filter 9a where water is drawn through the aquarium gravel, uniformly over the entire filter plate area. Conduits 3c and 3d lead from reservoir 9 and filter 9a respectively to flow control gate valves 3g and 3f, and then join to form another conduit 3e which leads to pump motor 1, thereby completing the water circulation of the fresh water system. Valve 3f is utilized in the following way. The valve 3f on the conduit 3d from the aquarium reservoir 9a controls the water level in the aquarium 24, maintaining a constant water level in the aquarium. That is, with the valve 3f on the conduit 3d closed or practically closed, the water level rises fast, and a great deal of water will flow over the top of the main partition 6. Conversely, with the valve 3f open, on conduit 3d, very little water will trickle over the edge of the partition 6. Valve 3g is used for maintenance only, when it is required to drain the terrarium 23.

The substrate 7 utilized in the terrarium section 23 is preferably a substrate suitable for the hydroponic cultivation of plants. Baked clay chips, gravel, or glass beads are typical of suitable substrate. When water enters the terrarium section 23 over the partition 6, some of it will flow downwardly, and some of it will be drawn upwardly by evaporation and by the capillary action of the substrate 7. It will be noted that since the water is not introduced uniformly to the substrate-atmosphere interface, the substrate will not be uniformly wet throughout; it will be considerably wetter adjacent the top edge of the partition than remote from same. Therefore if the porosity, particle size, adhesion characteristics and capillary action of the substrate 7 employed are known, it is possible to construct the terrarium section so that certain portions of it are suitable for particular species of plant life. In this way, the total number and variety of plants represented in the terrarium can be increased. An increased variety of plant species in the terrarium 23 is not only aesthetically pleasing, but will benefit the health of each plant in the terrarium 23 by ensuring a more balanced nutritional stress on the system than would be possible if only one or two ecologically similar species were cultivated.

Figure 2:
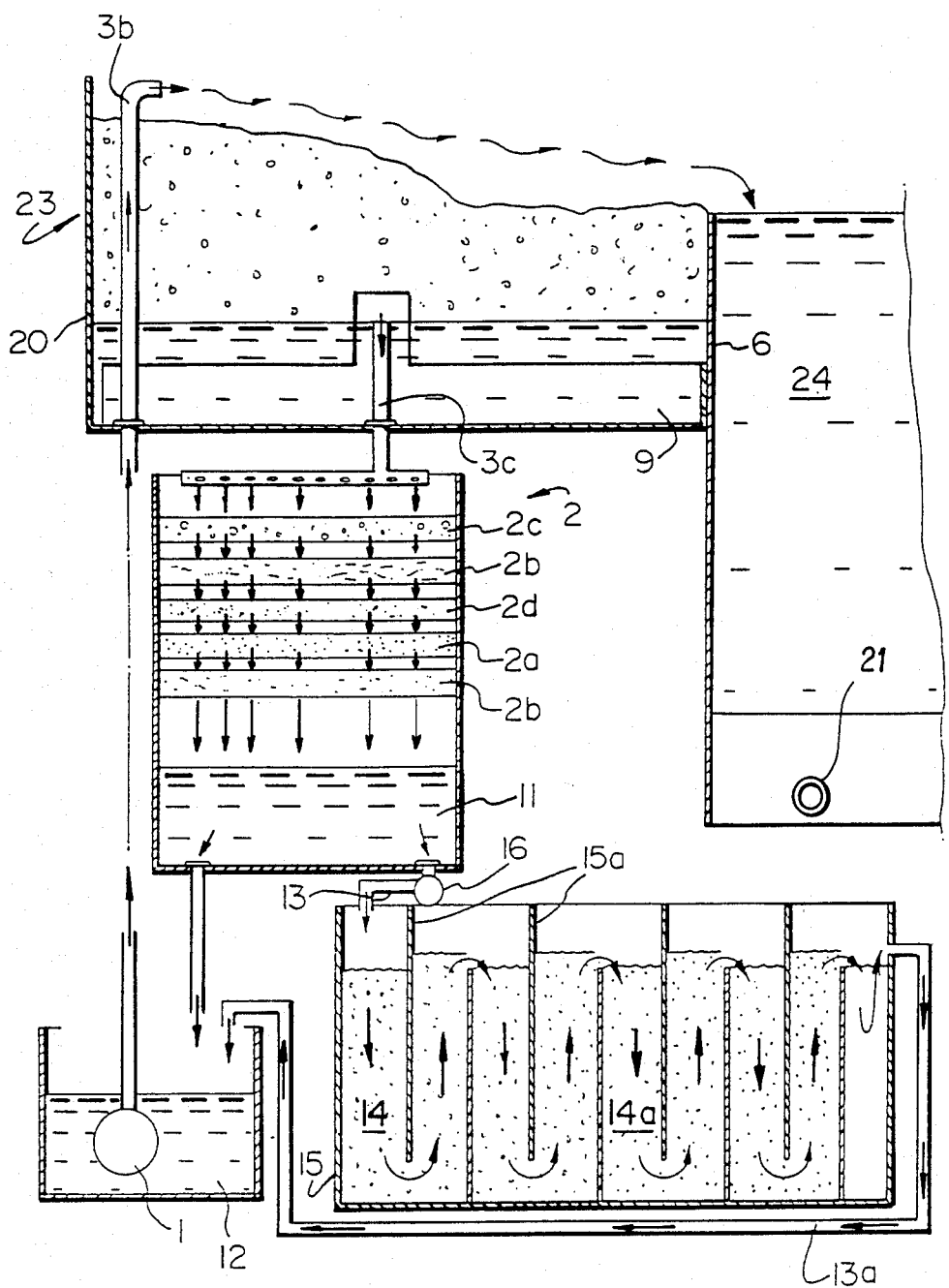
FIG. 2 is a schematic of a saltwater terrarium/aquarium embodiment of the present invention.

The fact that much of the water supply of the terrarium 23 comes from the aquarium 24 as overflow (instead of the other way around, as would seem to be obvious, as much of the terrarium is normally located above the water level of the terrarium/aquarium—see FIGS. 1 and 2), will result in very clean aquarium water. That is, since there is a flow of water over the entire length of the partition 6, from the aquarium 24 to the terrarium 23, it will be extremely unlikely that silt, detritus or other substances will be able to enter the aquarium 24 from the terrarium 23. In order to do so, such substance would have to travel against the water flowing from the aquarium to the terrarium, over the partition 6. Accordingly, with the present invention, maintenance of the aquarium 24 is facilitated.

Turning to the application of the present invention to marine ecosystems, tropical marine life (especially corals), tend to be highly specialized and diversified. Coral reef conditions, which tend to remain fairly constant, (e.g. temperatures, salinity, PH and light) have brought about this specialization and diversification. In contrast, most freshwater organisms have been forced to adapt to varied conditions in salinity, mineral concentration, temperature and PH. This makes freshwater organisms much more adaptable, less diversified and much less specialized. In general, they are far hardier than marine life.

Figure 3:
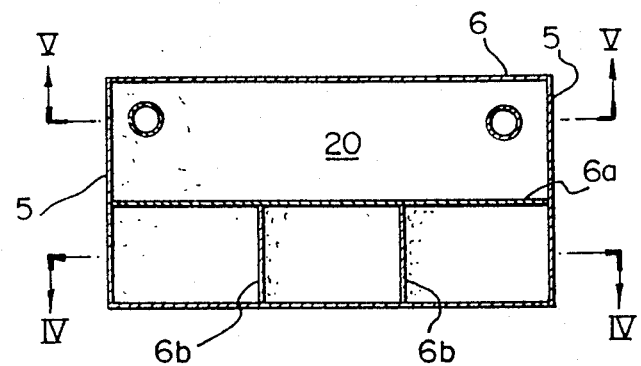
FIG. 3 is a schematic of the aquarium floor of the embodiment of FIG. 2.

Accordingly, in the present invention extra attention is given to providing an undergravel system in a marine aquarium tank, with the aim of substantially eliminating any anaerobic areas from forming in the aquarium floor (see FIG. 3). To this end, the bottom of the aquarium section 24 is partitioned in half by a secondary partition 6a to define front and back sections. The back section is a worm-bed 20, which will be discussed below. The front section houses a novel forward-reverse flow filter.

Figure 4:
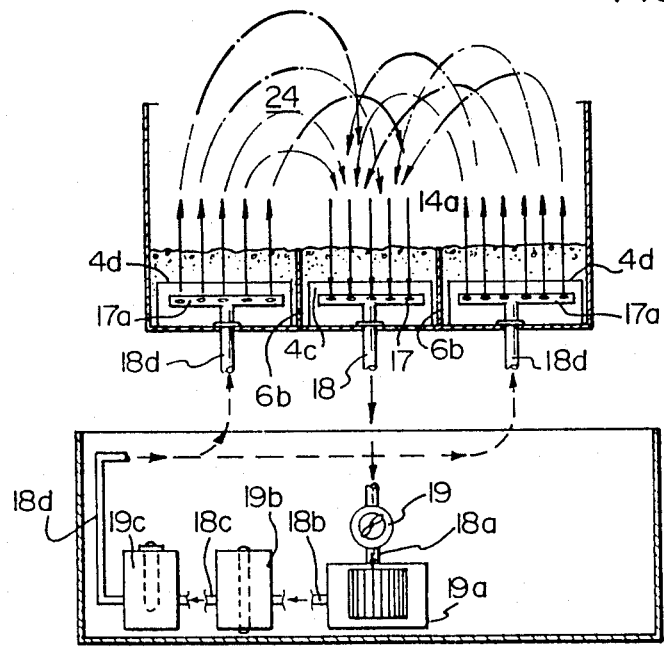
FIG. 4 is a section along line IV—IV in FIG. 3, combined with a schematic of a filter system preferably used in the embodiment of FIG. 2.

The front section is divided into three equal sub-sections, with vertical partitions 6b separating these areas (partitions are 3" high in a preferred embodiment). In FIG. 4, a magnetic drive pump 19 draws 800–1000 gal./hr. of water through the center section, which has a filter plate 4c under 2" of coral sand 14a, and into a perforated spray tube 17, which acts as a filter inlet. The water is then pumped through a first conduit 18 to the pump 19, which pumps the water through a second conduit 18a to a cartridge filter 19a, having about 25 square feet of filter material (in a preferred embodiment), then via a third conduit 18b to a UV sterilizer 19b and via a fourth conduit 18c to a heating unit 19c and back to the tank 24. The water returns to the tank 24 via conduits 18d which terminate in perforated spray tubes 17a disposed beneath filter plates 4d under the gravel in the two front outside sections, to create a reverse flow, relative to the flow into the centre section. This gives optimum conditions for nitrosomas; particularly in the front center area and the cartridge filter 19a. All detritis and debris is drawn to the centre plate 4c; the two outside sections are kept clean due to the reverse flow.

To clean the entire tank of all dirt, all that must be done is to disturb the sand 14a on front centre plate 4c. Dirt thereby is dislodged from the coral sand 14a and is drawn with considerable force to the cartridge filter 19a. If there is too much dirt, which will result in clogging of the cartridge filter 19a, the cartridge (not shown) can be easily removed and rinsed clean and put back without further disturbing the water in the tank 24. A total clean out of the floor of the tank can thereby usually be done in five about minutes, as opposed to the approximately one full working day usually required to clean the gravel bed of a large aquarium. Moreover, the gravel can be cleaned without disturbing the aquatic life in the tank 24 when the reverse flow system of the present invention is in place.

Figure 5:
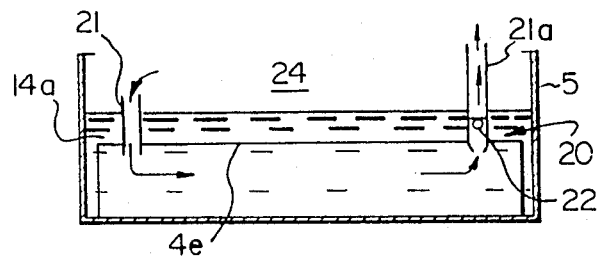
FIG. 5 is a partially schematic section along line V—V of FIG. 3.

In the other half of the aquarium floor (see FIG. 5), there is a worm-bed 20 on a filter plate 4e with 2"–3" of coral sand 14a over it. In the worm-bed half, there is no drawing of water through the coral sand. Instead, there is a low inlet 21 slightly above the sand communicating with a space beneath the filter plate 4e at one side, and a high outlet 21a above the sand communicating with the space below the filter plate 4e at the other side. These function to provide oxygenated water circulating across the bottom of the tank under the sand as follows. An airstone 22 with an associated air pump (not shown) is provided inside the base of the outlet 21a. The air bubbles force water up and out of the outlet 21a, drawing water in from the inlet 21 at the other end—the path of least resistance—and a flow of oxygenated water results around the coral sand floor 14a of the worm-bed.

The worms referred to above are located in the coral sand 14a of this half of the aquarium floor and include some worms which are calcium builders. That is, they absorb calcium. Also included are worms which are calcium eaters. These worms dissolve calcium and put it back into solution. The total worm population comprises several different species and by acting together, provide the normal ocean balance of dissolved calcium and PH. All the required species of worms and the various micro-organisms associated therewith which are needed are supplied and fed by old coral rock or live rock, out of the ocean not more than 12 hours. These rocks are particularly preferred if they are 100 or more years old, porous and with little life on their surfaces.

A further element of the marine system is a slightly more complex basic filter system than in the freshwater system, including a 'final filter'. This is an outside filter with a very slow rate of flow (about 50 gal./hr. max.) over broken coral rock pieces 14 and then coral sand 14a (see FIG. 2). The final filter functions on a controlled anaerobic bacterial level, where nitrate is finally reduced to nitrogen gas through a reducing agent—lactose—added every 2 weeks. This, along with the plants, helps to bring the nitrate levels low enough to allow corals (very delicate and sensitive marines) to do well. The inlets and outlets for the final filter system are associated with the basic filter system of the present invention, and draw approximately one seventh of the water filtered by the basic system into the final filter, through the final filter, and to the pump reservoir 12.

The overall structure of the basic filter system for the marine application of the present invention is as follows.

First, it is to be noted that in the marine system, there is no reservoir beneath the tank, because of the presence of the forward reverse filter and worm-bed 20. There remains a reservoir 9 beneath the terrarium 23, but the flow valve 3f in the conduit 3c leading from the reservoir 9 is not necessary, as the aim in a marine system is to produce constant environment. Instead, conduit 3c extends into the reservoir 9 and acts as an overflow pipe, drawing excess water from the reservoir 9 by gravity into a filter 2 including a vertical stack of elements—sponge 2c, floss 2b, coral sand 2d, "CHEMI-PURE" 2a and a second layer of floss 2b. The water percolates through this stack by gravity only, into a filter reservoir 11.

Approximately one-seventh of the water in the filter reservoir is drawn by a low speed pump 16, via a conduit 13 to a final filter which comprises walls 15 and vertical partitions 15a, alternate ones of which are offset vertically from the next, to define a maze-like passageway. The first half of the passageway is filled with crushed coral 14, and the second half with coral sand 14a. At the end of the passageway, a second final filter conduit 13a leads to the pump reservoir 12, which also receives the other six-sevenths of the flow from the basic filter. Conduit 3b leads from the pump reservoir 12 to the upper surface of the terrarium 23, as in the freshwater system.

Two further elements are employed in the preferred embodiments of the terrarium/aquarium combination of the present invention. First, it is desirable to provide a timed light source 25 (see FIG. 1), in order to duplicate, as closely as possible, the diurnal cycle of the plants which are being cultivated in the terrarium, and the fish or other lifeforms being raised in the aquarium. Furthermore, the light source should be capable of providing sufficient warmth for the plants and animals raised, and should be capable of promoting photosynthesis. That is, it should emit radiation in the correct spectrum to imitate light photosynthesis reactions in the plants of the terrarium. Suitable light sources 25 include LONGLIFE GLOWLUXK and WARMWHITEK fluorescent lamps, especially a combination of the two.

The other element which is desirable is a ventilation system. A ventilation system (see FIG. 1) for the present invention is fairly simple, and comprises an electric fan 26 equipped with a timer 26a and dimmer switch (not shown). However, it has heretofore not been the practice to provide such a ventilation system as with normal watering systems, which introduce moisture onto the surface of the terrarium substrate and plants, the presence of a ventilation system has had the effect of causing over-rapid evaporation from the soil surface and the leaf surfaces of the plants. If such evaporation is permitted—or promoted—plant roots will not receive enough moisture, and accordingly, plants will tend to wither. As well, evaporation off a leaf surface will tend to burn and sear that surface. With the introduction, though, of the integrated water circulation system of the present invention, which causes a flow of water into the substrate of the terrarium 23, and therefore directly to the roots of the plants, a ventilation system is very beneficial. Evaporation of surface water build up from the leaves of plants is replaced by transpiration of water drawn from the roots, with a resulting healthy flow of water through the plant, which benefits the plant tremendously.

The ventilation system also has a beneficial influence on the air in the room in which the terrarium/aquarium of the present invention is situated. That is, the ventilator fan will flow "stale" room air (that is, air which is dry, low in $O_2$ content and higher in $CO_2$ content) into the terrarium. The plants in the terrarium will absorb some of the $CO_2$, and will enrich the $O_2$ content of the air. Water, from transpiration occurring at the leaf surfaces of the plants, and evaporation from the aquarium will humidify the air. Therefore, as the room air exits the terrarium/aquarium of the present invention, it will be considerably fresher, and healthier than previously.

The ventilation system may also be used to simulate the natural climate of the particular species of plants in the terrarium. For instance, if tropical species such as orchids are cultivated, a rain-forest wind pattern can be simulated, with the fan timer 26a and the dimmer activating the fan at appropriate speeds at appropriate times of the day, to produce convectional moisture distribution patterns in the foliage of the terrarium 23.

With a marine system application of the present invention, another two considerations apply. First, plants above the water line should be chosen for their ability to separate water from salt. Examples of such plants are palms, mangroves and mosses. Secondly, in the marine system, a fresh water spray (not shown) is provided above the water surface of the terrarium to wash salt off the terrarium surface and to compensate for water lost through evaporation, thereby maintaining the level of salinity in the system as a whole.

In summary, it can be seen that the present invention provides a novel terrarium/aquarium combination which has at least the following benefits:

(a) it provides, with little maintenance, a variety of different moisture conditions in the substrate of the terrarium, and thereby permits the cultivation of a variety of different species of plants;

(b) it provides an aquarium in close proximity to the terrarium while substantially eliminating contamination of the aquarium from silt and other debris of the terrarium;

(c) it provides means for freshening and humidifying room air; and (d) it provides visually and auditorily attractive environment for examination, entertainment, and study.

I claim:

1. In combination, an aquarium and a terrarium, said aquarium and terrarium being in a common container and being separated from one another by a partition of predetermined height, said combination including an integrated water circulation system, said water circulation system including a primary pump, a primary filter with a filter pump, at least one conduit extending from said primary pump for carrying a flow of clean filtered water over said terrarium to said aquarium, and at least one conduit extending from said terrarium to said filter pump and filter for carrying a flow of water to said filter for cleaning; said terrarium being supplied with water from said aquarium by means of an overflow of water over said partition; said terrarium comprising a hydroponic substrate; a filter plate disposed between said hydroponic substrate and the at least one conduit leading from said terrarium to said filter pump and filter, whereby water is permitted to freely flow from said substrate to said filter; ventilation means associated with the terrarium; said ventilation means comprising an electric fan provided with a first timer means for actuating the fan at a predetermined time and for a predetermined duration, whereby the climate associated with a selected ecosystem may be simulated.

2. A combination as claimed in claim 1 wherein there is also provided photosynthesis promotion means.

3. A combination as claimed in claim 2 wherein said photosynthesis promotion means comprises a light source capable of emitting radiation in a spectrum corresponding to the spectrum necessary for promoting the light photosynthesis reaction in a selected plant.

4. A combination as claimed in claim 3 wherein said light source is coupled with a second timer, whereby the diurnal cycle in said selected ecosystem may be simulated.

5. A combination as claimed in claim 4, wherein said aquarium contains fresh water, and said primary filter contains filter elements suitable for filtering fresh water aquarium water.

6. A combination as claimed in claim 5, wherein said filter elements includes at least one elements selected from the group including an ion filter medium, floss and sponge.

7. A combination as claimed in claim 4, wherein said aquarium contains salt water, said primary filter contains filter elements suitable for filtering salt water aquarium water, and said primary pump is disposed between said filter and said aquarium.

8. A combination as claimed in claim 7, further including an overflow pipe from a first reservoir beneath said terrarium to said filter elements, whereby water is permitted to flow from said first reservoir through said elements by gravity, to a second reservoir, said primary pump being associated with said second reservoir, to draw water from said second reservoir and deliver it to said aquarium.

9. A combination as claimed in claim 8, further including a heater disposed between said second reservoir and said primary pump, to heat said water to a desired temperature to sustain aquatic life.

10. A combination as claimed in claim 9, further including a UV sterilizer disposed between said second reservoir and said primary pump to sterilize water.

11. A combination as claimed in claim 10 wherein said filter elements include at least one elements chosen from the group including floss, coral sand, sponge and an ion filter medium.

12. A combination as claimed in claim 11 further including a secondary filter, with a secondary pump, associated with said second reservoir, for drawing a portion of the water passing through said primary filter through a tortuous passageway filled with coral rock and coral sand to which lactose has been added, thereby to reduce nitrates in said water to nitrogen gas.

13. A combination as claimed in claim 12 further including a tertiary filter disposed beneath the floor of said aquarium.

14. A combination as claimed in claim 13 wherein the floor of said aquarium is divided into front and rear parts by a vertical partition, one of said parts defining a worm-bed, and the other of said parts being further divided into three sub-parts by two transversely extending partitions, the outer two of said three sub-parts housing an inlet for said tertiary filter; and the centermost sub-part housing an outlet for said tertiary filter.

15. A combination as claimed in claim 14, wherein each of the three sub-parts is provided with a filter plate covered with coral sand, and beneath said filter plate, said inlet or said outlet.

16. A combination as claimed in claim 15 wherein said inlets and said outlets comprise perforated tubes.

17. A combination as claimed in claim 16 wherein said inlet is connected to a tertiary pump provided with a cartridge filter, the outlet from said cartridge filter being connected to the perforated outlet tubes in said outermost sub-parts.

18. A combination as claimed in claim 17 including heater and UV sterilizer elements between said cartridge filter and said perforated outlets.

19. A combination as claimed in claim 18 wherein said worm-bed comprises a filter plate having coral sand on it, an outlet pipe extending above the sand at one side of the plate, an inlet extending above the sand at the other side of the plate, and an air stone with an associated air pump, situated in said outlet.

20. A combination as claimed in claim 17 wherein said worm-bed comprises a filter plate having coral sand on it, an outlet pipe extending above the sand at one side of the plate, an inlet extending above the sand at the other side of the plate, and an air stone with an associated air pump, situated in said outlet.

21. A combination as claimed in claim 18 wherein said worm-bed comprises a filter plate having coral sand on it, an outlet pipe extending above the sand at one side of the plate, an inlet extending above the sand at the other side of the plate, and an air stone with an associated air pump, situated in said outlet.

* * * * *